United States Patent [19]

Takatsuji et al.

[11] Patent Number: 4,674,014
[45] Date of Patent: Jun. 16, 1987

[54] MOUNTING STRUCTURE FOR VEHICULAR LIGHTING UNIT

[75] Inventors: Kouichi Takatsuji, Zama; Masaru Takasaki, Ebina, both of Japan

[73] Assignee: Nissan Motor Co., Ltd., Yokohama, Japan

[21] Appl. No.: 779,105

[22] Filed: Sep. 23, 1985

[30] Foreign Application Priority Data

Sep. 28, 1984 [JP] Japan .............................. 59-145796[U]
Sep. 28, 1984 [JP] Japan .............................. 59-145797[U]

[51] Int. Cl.⁴ .............................................. F21V 15/00
[52] U.S. Cl. ....................................... 362/80; 362/376
[58] Field of Search .................... 362/61, 80, 376, 378, 362/457

[56] References Cited

U.S. PATENT DOCUMENTS 4,477,864 10/1984 Van Duyn et al. .................... 362/80
4,503,487 3/1985 Kakuda ................................ 362/376

FOREIGN PATENT DOCUMENTS 57-76148 5/1982 Japan .

Primary Examiner—Carroll B. Dority, Jr.
Attorney, Agent, or Firm—Schwartz, Jeffery, Schwaab, Mack, Blumenthal & Evans

[57] ABSTRACT

A mounting structure for a vehicular lighting unit is provided with a restriction means to prevent the lighting unit from being dismantled from the outside of the vehicle without removing the cover member on the lighting unit.

8 Claims, 24 Drawing Figures

MOUNTING STRUCTURE FOR VEHICULAR LIGHTING UNIT

FIELDS OF APPLICATION IN INDUSTRIES

The present invention relates to a mounting structure for vehicular lighting unit to be used for such purpose as to mount a number plate light for vehicle on the body panel of the vehicle.

BACKGROUND OF THE INVENTION

Heretofore, many mounting structures for the vehicular lighting unit have been developed for illuminating e.g. the number plate.

One of the mounting structures for the vehicular lighting unit of this kind is, for example, disclosed in Japanese unexamined Utility Model Application No. SHO-57-76148, which is incorporated into the present specification by reference.

In such a structure, a mounting port with a pair of notches is provided on a body panel (rear end panel) of the vehicle, and for example, a number plate light unit is snugly inserted to the mounting port and supported by the body panel such that a pair of engaging sections of the number plate light unit go through the notches e.g. from the front side of the body panel and rotated on the back side of the panel.

The mounting structure of one-touch type as mentioned above is preferable in a case, for instance, where the lighting unit is fixedly attached to the inside of the body panel by the use of machine screws, when considered from the work efficiency point of view, but has a disadvantage that it is feared that it may be easily dismantled from the outside.

Namely, although the number light is arranged not to be directly seen by the covering with a finisher that is installed on the body panel, there is still a possibility that it may be dismantled by turning the main body or lens of the number light unit which can be pinched and rotated for disassembling with fingers or a tool that is inserted from the bottom gap behind the finisher.

Accordingly, a primary object of the present invention is to provide a mounting structure for vehicular lighting unit that in spite of allowing it to be mounted in one touch by turning, permits also to restrict the turning of the lighting unit after the completion of its mounting.

Another object of the present invention is to provide a mounting structure for vehicular lighting unit which makes it difficult to dismantle the light unit without adversely affecting the workability at the time of installation of the lighting unit.

Another object of the present invention is to provide a mounting structure for vehicular lighting unit which makes it impossible to disassemble the lighting unit from the body panel before removing the finisher from the body panel.

SUMMARY OF THE INVENTION

In order to accomplish the above objects, in the present invention in which a lighting unit is mounted on a body panel by inserting the mounting section of the lighting unit into the mounting port of the body panel and by turning it, it is given a structure where there is provided a restriction or stopper means for restricting or stopping the turning of the lighting unit so that it is impossible to dismantle the lighting unit from outside after completing the assembly of the lighting unit on the body panel.

DETAILED DESCRIPTION OF EMBODIMENTS

Referring to the attached drawings, embodiments of the present invention incorporated in a body panel (rear-end panel) 1 of a vehicle will be described in detail in the following.

On the body panel 1 in FIG. 1 and FIG. 2, there are mounted a number plate 3 and a lighting unit 5 (e.g. number light) which is attached fixedly to the body panel above the number plate 3 by usual means as set forth hereinafter. The lighting unit includes a main body or lens 7 which is projected to the outside of the body panel 1 and contains a bulb therein, and a housing 8 for mounting the bulb thereto.

On the rear body panel of the vehicle, there is formed a mounting port 9 on the edge of which are provided a pair of notchs 13 situated diagonally opposing. Mounted on the mounting port 9 is the lighting unit 5, which further includes a mounting section 11 which is inserted and fixedly attached to the mounting port 9 of the body panel 1. On the mounting section 11, there are provided a pair of engaging sections 15 which correspond to the pair of notches 13 that are formed on the mounting port 9, as well as make contact with the inner panel surface 1a of the body panel 1, and a flange 17 that makes contact with the outside panel surface 1b of the body panel 1. On the outer periphery of the lens 7 there are provided the pair of engaging portions or projections 15 corresponding to the notches 13 that are engaged e.g. from outside to the edge section of the mounting port 9 to form one side of the body panel 1. These projections 15 are constructed so as to be able to clear the notches 13 when they are positioned facing the notches 13. In addition, on the end section of the lens 7 on the side of the housing 8, there are provided protrusively, as an engaging section, a flange 17 which engages to the inner side of the circumference of the mounting port 9 to form the other side of the body panel 1. By this arrangement, the lighting unit 5 is snugly inserted into the mounting port 9 and supported by the body panel 1 such that the pair of engaging section 15 of the lighting unit go through the notches 13 e.g. from the outside of the body panel 1 and rotated so that the flange 17 and the engaging section 14 clamp the body panel 1 from its outside and inside.

A finisher 21 is fixed to the body panel 1 for covering the lighting unit 5 to make it invisible from the outside, so that the number plate 3 is illuminated by the light from the lighting unit 5.

According to the present invention, close to and surrounding the main body of the lighting unit 5, there is provided a restriction means 19 that prevents access to the mounting section after assembling with illumination to a desired region secured, which is described in detail hereinafter.

The finisher 21 is installed on the body panel 1 to hang down in front of the main body 7 of the lighting unit. Formed solidly on the inside of the finisher 21 is the restriction means 19 surrounding the upper half of the main body 7 of the lighting unit in arch-like form along the direction of its circumference and giving an illuminated region A for the lower half.

The region for illumination A is set to give convenience for illuminating the number plate down below, and the gap between the restriction means 19 and the main body 7 of the lighting unit is chosen so as to preclude the insertion of fingers or a tool therein intending to remove the lighting unit therefrom.

Figure 3:
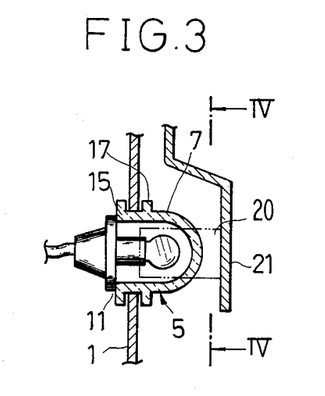
FIG. 3 is a cross sectional view similar to FIG. 1 of another embodiment of the present invention.
Figure 4:
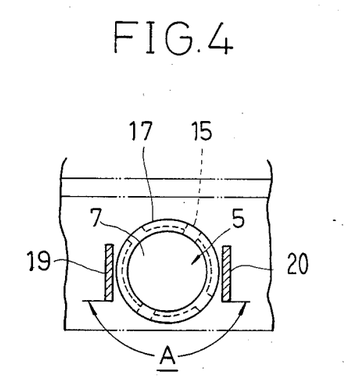
FIG. 4 is a cross sectional view along the IV—IV line of FIG. 3.

FIG. 3 and FIG. 4 illustrate another embodiment of the restriction means 20. Analogous to the previous embodiment, the restriction means 20 is installed on the inside of the finisher 21 to be close to the main body 7 of the lighting unit and to secure a desired region of illumination in its surroundings. However, a difference is given in its construction in which the restriction means 20 is made by a pair of vertical plate-like members laterally arranged on both sides of the main body 7 of the lighting unit.

Figure 5:
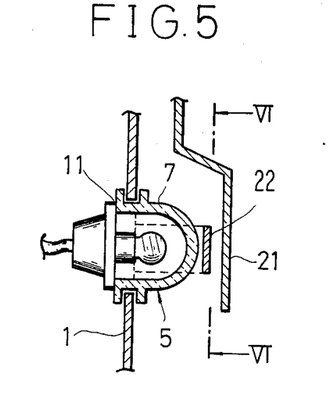
FIG. 5 is a cross sectional view similar to FIG. 1 of another embodiment of the present invention.
Figure 6:
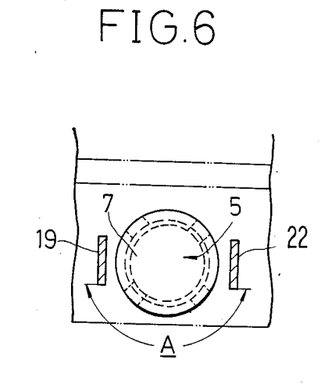
FIG. 6 is a cross sectional view along the VI—VI line of FIG. 5.

FIG. 5 and FIG. 6 illustrate another embodiment of the arch like restriction means 22 which is laterally installed on the side of the body panel.

Figure 7:
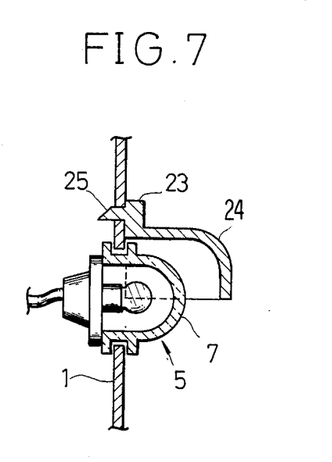
FIG. 7 is a cross sectional view similar to FIG. 1 of still another embodiment of the present invention.
Figure 8:
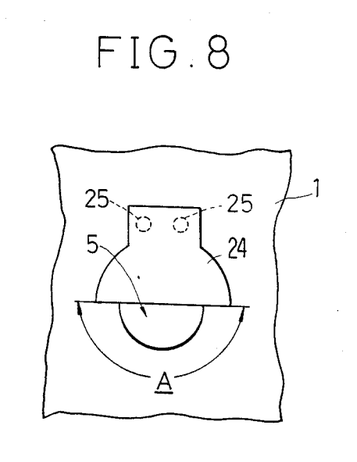
FIG. 8 is a rear elevational view of the embodiment shown in FIG. 7.

FIG. 7 and FIG. 8 illustrate another modification to the restriction means. The restriction means 24 for this embodiment is formed in a semi-spherical shape and the flange section 23 for mounting is fixed to the body panel 1 with clips 25. Therefore, the front and the circumferential direction of the upper half of the main body 7 of the lighting unit are enclosed by the restriction means 24, so that it can do without a finisher 21.

In operation for mounting the lighting unit for FIG. 1 through FIG. 6, the mounting section 11 of the lighting unit 5 is faced with the mounting port 9 in the body panel 1, the lighting unit is inserted fully through the mounting port 9 until the flange 17 makes a forced contact with the panel surface 1b while positioning the engaging section or projection 15 of the mounting section 11 to the notches 13 on the mounting port 9, and then turning the lighting unit by a predetermined amount e.g. about 90 degree (in the direction of the arrow B in FIG. 2) to establish a state in which the projections 15 are engaged to the inside of the body panel 1, while the flange 17 is engaged to the outside of the body panel 1. Thus, it is possible to mount the lighting unit in one touch. Mounting is complete by installing then the finisher 21 on the body panel 1. Moreover, for the embodiments shown in FIG. 7 and FIG. 8, the restriction means 19 is installed in one touch after mounting the lighting unit 5 as described earlier.

After mounting is completed, the lighting unit 5 illuminates the number plate 3 down below which is located within the region of illumination. On the other hand, dismantling of the lighting unit from the outside without disassembling the body panel 1 becomes impossible since illicit attempts to use fingers or a tool will be precluded by the restriction means 19.

It is to be noted that although the embodiments given in the foregoing represent the type in which the lighting unit 5 is to be mounted from the outside, it may also be the type in which the restriction means 19 is installed beforehand on the body panel 1 and the lighting unit 5 is mounted later from the inside of the body panel 1. In such a case, the flange 17 on the mounting section 11 is to be provided on the inside of the body panel 1 and the engaging sections or projection 15 are to be provided so as to be located on the outside of the body panel 1, which is illustrated, e.g., in FIG. 9(a) and FIG. 9(b).

Figure 9A:
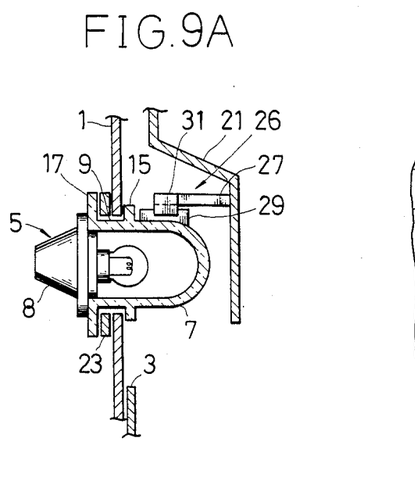
FIG. 9(a) is a cross-sectional view of another embodiment of the present invention.
Figure 9B:
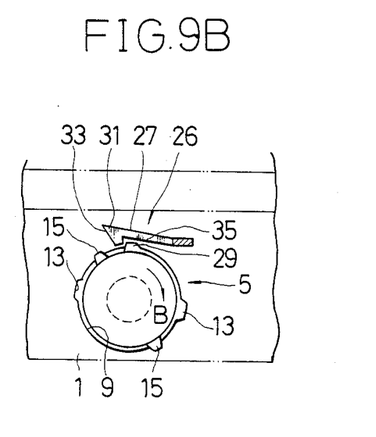
FIG. 9(b) is a partly cut-away front elevational view of the embodiment of FIG. 9(a).

In another embodiment of the present invention as shown in FIGS. 9(a) and (b), there is provided a stopper means 26 which is capable of restricting the turning of the lighting unit 5 with respect to the body panel 1 after the mounting of the lighting unit. The stopper means 26 is contructed by an elastic stopper arm 27 one end of which is fixed solidly to the inner side of a finisher 21 and a rib 29 which is formed on the outer periphery surface of the main body or lens 7 of the lighting unit 5. At the other end of the stopper arm 27 there is provided a hook section 31 on which is prepared a guide surface 33 for letting the hook section 31 to ride over the rib 29 at the time of turning the lighting unit 5 for assembling. In addition, a similar guide surface 35 is formed also on the rib 29 to cooperate with the guide surface 33.

Moreover, the turning of the lighting unit 5 in the direction of assembling is restrained from overshooting the state in which the rib 29 is engaged to the hook section 31 by such arrangement as the engagement of the projections 17b to projecting pieces (not shown) that are formed on the body panel 1. The stopper means 26 is arranged to be installed at a position which is invisible from the outside by covering it with the finisher 21.

Figure 1:
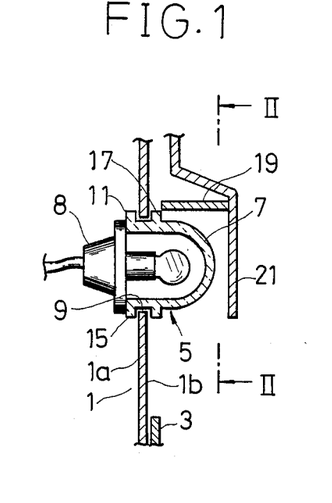
FIG. 1 is a cross sectional view of one embodiment of the mounting structure for lighting unit in accordance with the present invention.
Figure 2:
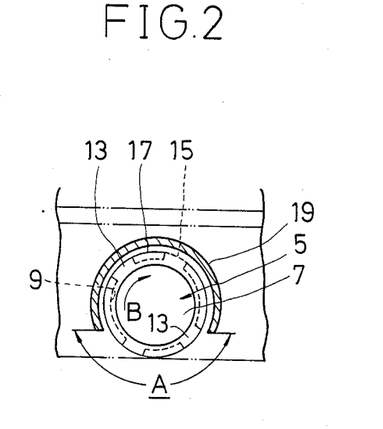
FIG. 2 is a cross sectional view along the II—II line of FIG. 1.

In operation, the mounting of the lighting unit 5 on the mounting port 9 is done in a direction opposite to the case of the embodiments as shown in FIG. 1 and FIG. 8. Namely, the side of the lens or main body 7 of the lighting unit 5 is inserted from the inner side of the body panel 1 into the mounting port 9 with the projections 15 positioned so as to face the notches 13, and then the lighting unit 5 is turned in the direction of assembling (the direction of the arrow B in FIG. 9(b)). Here, the amount of projection of the rib 29 is chosen to be less than the difference between the inner periphery of the mounting port 9 and the outer periphery of the lens 7 in order not to hinder the insertion of the lens 7 into the port 9. When the guide surface 35 of the rib 29 is forced to make contact with the guide surface 33 of the hook section 31 of the stopper arm 27, due to turning of the lighting unit 5 in the direction of assembling, the hook section 31 of the stopper arm 27 runs over the rib 29 to be engaged to it under the guiding action of the guide surfaces 33 and 35 and the elasticity of the stopper arm 27. Therefore, the hook section 31 hooks the rib 29 as shown by FIG. 9(b). In this state, the projections 15 of the lighting unit 5 are engaged to the edge of the mounting port 9 on the outside of the body panel 1 and the flange 17 is engaged via the elastic body 23 to the edge of the mounting port on the inside of the body panel 1, completing the mounting of the lighting unit 5. After the mounting of the lighting unit 5, the turning in the direction of dismantling the lighting unit 5 with respect to the body panel 1, becomes to be restricted by the hooking of the rib 29 by the hook section 31. Moreover, since the stopper means 26 is installed at a position which is not possible to be recognized visually from the outside, it does not permit to be confirmed that the turning of the lighting unit 5 is restricted by the stopper means 26. This indicates that the turning of the lighting unit 5 by means of a hand or a tool inserted through the gap between the body panel 1 and the finisher 21 is extremely difficult, precluding the fall-off or the like of the lighting unit 5 to the inside of the body panel 1. Furthermore, the stopper means 26 will be located above the lighting unit 7 in the assembled state so that there will result no inconvenience for the illumination of the number plate by the lighting unit 5.

Moreover, in the assembled state of the lighting unit 5 as shown by FIG. 9(b), the turning in the direction of assembling of the lighting unit 5 is restricted by an arrangement such as to have the projections 15 to be engaged to the projecting pieces (not shown) that are formed on the body panel 1.

Figure 10A:
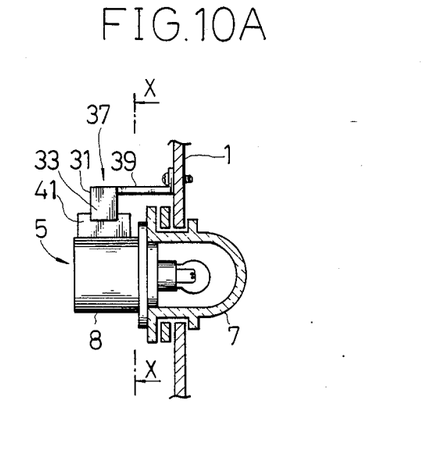
FIG. 10(a) is a cross-sectional view of another embodiment of the present invention.
Figure 10B:
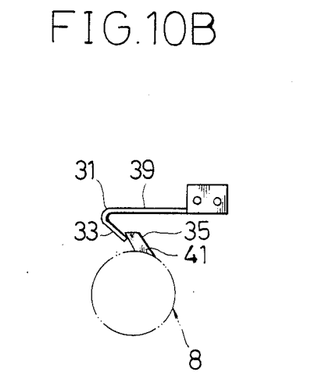
FIG. 10(b) is a cross-sectional part view taken along the line X—X of FIG. 10(b).

FIG. 10(a) and FIG. 10(b) relate to another embodiment of the invention. In the embodiment, a stopper means 37 is constructed by a stopper arm 39 which is fixed to the inner side of the body panel 1 with machine screws and a rib 41 which is formed on the housing 8 of the lighting unit 5.

Figure 11:
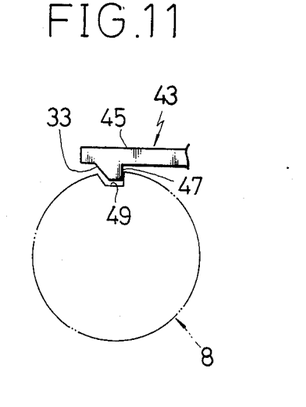
FIG. 11 is a view similar to FIG. 10(b) of another embodiment of the present invention.

FIG. 11 relates to another embodiment, in which the stopper means 43 includes a stopper arm 45 which is installed unitedly to or separately from a finisher or the body panel that is not shown, and a depressed section 49 formed on the housing 8 of the lighting unit 5 to which the hook section 47 of the stopper arm 45 is to be fit snugly.

Figure 12:
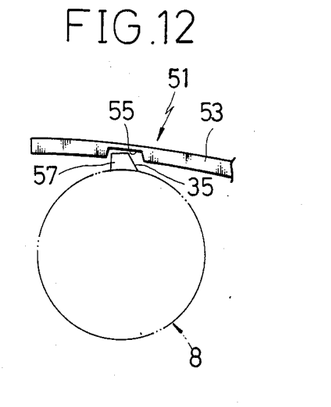
FIG. 12 is a view similar to FIG. 10(b) of another embodiment of the present invention.

FIG. 12 relates to another embodiment, in which a stopper means 51 includes a stopper arm 53 which is installed unitedly to or separately from a finisher or the body panel, and a rib 57 formed on the housing 8 of the lighting unit 5 which is to be hooked to the hook indentation 55 on the stopper arm 53.

It should be noted that such a rib 35, 57 and a depression 49 can be formed on the lens or main body 7 when the stopper means is provided on the outside of the body panel.

Figure 13A:
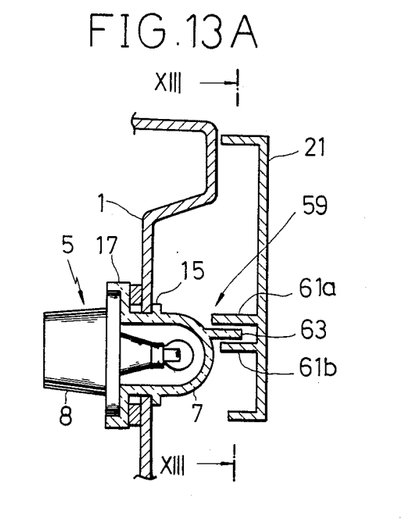
FIG. 13(a) is a cross sectional view of another embodiment of the present invention.
Figure 13B:
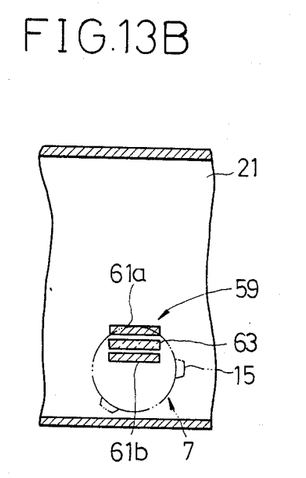
FIG. 13(b) is a partly cut-away cross-sectional view of FIG. 13(a).

FIG. 13(a) and FIG. 13(b) relate to another embodiment, in which the stopper means 59 consists of a first rib 61a and a second rib 61b that are formed solidly on the side of the finisher 21, and a third rib 63 which is formed solidly on the side of lens 7 of the lighting unit 5 to be sandwiched between the first rib 61a and the second rib 61b. In this embodiment, therefore, the third rib 63 can be inserted between the first rib 61a and the second rib 61b by installing the finisher 21 after the mounting of the lighting unit 5 on the mounting port is completed. In this case, the rotation of the lighting unit 5 in either the assembling direction or in the dismantling direction is restricted by the sandwiching of the third rib with the first rib 61a and the second rib 61b.

Figure 14A:
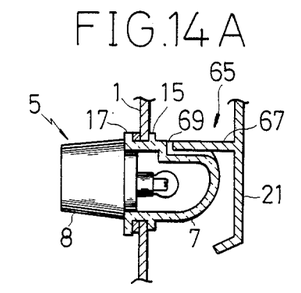
FIG. 14(a) is a cross sectional view of another embodiment of the present invention.
Figure 14B:
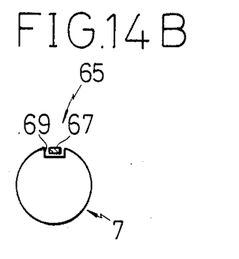
FIG. 14(b) is a front elevational view of the embodiment of FIG. 14(a) with the finisher cut-away.

FIG. 14(a) and FIG. 14(b) relate to another embodiment which is a modification to the embodiment of FIGS. 13(a) and 13(b). In the embodiment, a stopper means 65 consists of a rib 67 which is installed solidly on the side of the finisher 21, and an indentation 69 provided on the side of the lens 7 of the lighting unit 5 to which the rib 67 is to be fit snugly.

Figure 15A:
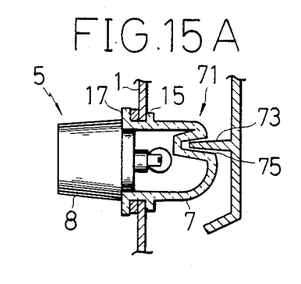
FIG. 15(a) is a cross sectional view of another embodiment of the present invention.
Figure 15B:
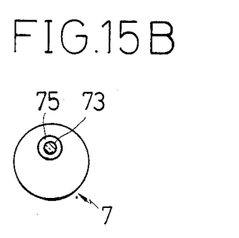
FIG. 15(b) is a front elevational view of the embodiment of FIG. 15(a) with the finisher cut-away.

FIG. 15(a) and FIG. 15(b) relate to another embodiment, in which a stopper means 71 consists of a pin 73 which is installed solidly on the side of the finisher 21, and a fitting hole 75 formed at the tip of the lens 7 of the lighting unit 5 to which the pin 73 fits snugly.

Figure 16A:
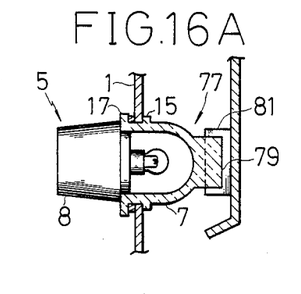
FIG. 16(a) is a cross sectional view of an eighth embodiment.
Figure 16B:
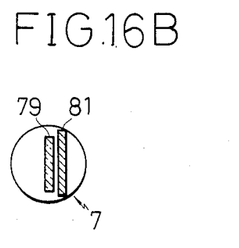
FIG. 16(b) is a front elevational view of the embodiment of FIG. 16(a) with the finisher cut-away.

FIG. 16(a) and FIG. 16(b) relate to another embodiment, in which a stopper means 77 consists of a first rib 81 which is installed solidly on the side of the finisher 21, and a second rib 79 which is installed solidly on the tip of the lens of the lighting unit 5.

Figure 17A:
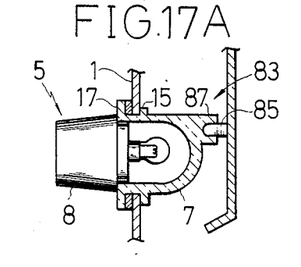
FIG. 17(a) is a front elevational view of another embodiment of the present invention.
Figure 17B:
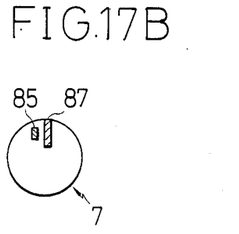
FIG. 17(b) is a front elevational view of the embodiment of FIG. 17(a) with the finisher cut-away.

FIG. 17(a) and FIG. 17(b) relate to another embodiment, in which the turning in the assembling direction of the lighting unit 5 is restricted by the forced contact of the projections 15 with the projecting pieces that are formed on the body panel 1, and the rotation in the dismantling direction of the lighting unit 5 is fixed one direction. Here, a stopper means 83 consists of a pin 85 which is installed solidly on the side of the finisher 21, and a rib 87 installed solidly on the side of the lens of the lighting unit 5 which engages with the pin 85.

In the above embodiments, FIG. 9 through FIG. 12 correspond to the structures in which the stopper arms 27, 39, 45, and 53 are set in advance by installing the finisher 21 beforehand on the body panel 1, and then the lighting unit 5 is installed on the body panel 1. In contrast, in the embodiments corresponding to FIG. 13 through FIG. 17, the installation of the finisher 21 on the body panel 1 is made after the lighting unit 5 is installed on the body panel 1.

In summary, as described in the foregoing, according to the construction of the present invention, it becomes possible to restrict the turning of the lighting unit with respect to the body panel after the mounting of the lighting unit by the use of a stopper means. Moreover, the stopper means is installed at a position which is invisible from the outside. Therefore, it becomes difficult to turn the lighting unit in the dismantling direction by means of a hand or a tool, disengaging the lighting unit to the inside of the body panel or pulling it out to the outside of the body panel. Consequently, according to the mounting structure of the present invention, it becomes possible to secure the workability which is equivalent to that in the prior art in mounting the lighting unit, as well as to prevent the dismantling of the lighting unit by illicit attempt, e.g., by manipulating the main body of the lighting unit with fingers or tools which is prevented by the restriction means.

What is claimed is:

1. A mounting structure for mounting a vehicular lighting unit to a mounting port formed on a body panel by inserting said lighting unit through said mounting port, said lighting unit being partly covered by a cover member, said mounting structure comprising a mounting section formed on said lighting unit, said mounting port having a notch formed on the outer periphery of said mounting port, said mounting section comprising at least one engaging portion provided on the outer periphery of the mounting section, the shape of said engaging portion corresponding to said notch so as to pass through said notch when assembling, and a flange provided along the outer periphery of said mounting section such that said body panel along the outer periphery of said mounting port is sandwiched by said engaging section and said flange when said engaging section is rotated upon assembling, and said mounting structure further comprising a restriction means for making it impossible to rotate said lighting unit from the outside without removing said cover member, wherein said restriction means is a member provided close to said lighting unit for preventing access to said mounting section after assembly and said restriction means comprises an arch-like member vertically surrounding said lighting unit.

2. A mounting structure for mounting a vehicular lighting unit to a mounting port formed on a body panel by inserting said lighting unit through said mounting port, said lighting unit being partly covered by a cover member, said mounting structure comprising a mounting section formed on said lighting unit, said mounting port having a notch formed on the outer periphery of said mounting port, said mounting section comprising at least one engaging portion provided on the outer periphery of the mounting section, the shape of said engaging portion corresponding to said notch so as to pass through said notch when assembling, and a flange provided along the outer periphery of said mounting section such that said body panel along the outer periphery of said mounting port is sandwiched by said engaging section and said flange when said engaging section is rotated upon assembling, and said mounting structure further comprising a restriction means for making it impossible to rotate said lighting unit from the outside without removing said cover member, wherein said restriction means is a member provided close to said lighting unit for preventing access to said mounting section after assembly and said restriction means comprises an arch-like member laterally surrounding said lighting unit the leg portions of which are connected to said body panel.

3. A mounting structure for mounting a vehicular lighting unit to a mounting port formed on a body panel by inserting said lighting unit through said mounting port, said lighting unit being partly covered by a cover member, said mounting structure comprising a mounting section formed on said lighting unit, said mounting port having a notch formed on the outer periphery of said mounting port, said mounting section comprising at least one engaging portion provided on the outer periphery of the mounting section, the shape of said engaging portion corresponding to said notch so as to pass through said notch when assembling, and a flange provided along the outer periphery of said mounting section such that said body panel along the outer periphery of said mounting port is sandwiched by said engaging section and said flange when said engaging section is rotated upon assembling, and said mounting structure further comprising a restriction means for making it impossible to rotate said lighting unit from the outside without removing said cover member, wherein said restriction means comprises a stopper means for preventing the rotation of said lighting unit, said stopper means comprising a stopper arm extending from said cover member, and a rib formed on the lighting unit such that the locking relationship between said stopper arm and said rib allows the rotation of said lighting unit in one direction but prohibits the rotation of the lighting unit in the opposite direction.

4. The mounting structure of claim 3 wherein said stopper means is provided on the outside of said body panel.

5. A mounting structure for mounting a vehicular lighting unit to a mounting port formed on a body panel by inserting said lighting unit through said mounting port, said lighting unit being partly covered by a cover member, said mounting structure comprising a mounting section formed on said lighting unit, said mounting port having a notch formed on the outer periphery of said mounting port, said mounting section comprising at least one engaging portion provided on the outer periphery of the mounting section, the shape of said engaging portion corresponding to said notch so as to pass through said notch when assembling, and a flange provided along the outer periphery of said mounting section such that said body panel along the outer periphery of said mounting port is sandwiched by said engaging section and said flange when said engaging section is rotated upon assembling, and said mounting structure further comprising a restriction means for making it impossible to rotate said lighting unit from the outside without removing said cover member, wherein said restriction means comprises a stopper means for preventing the rotation of said lighting unit said stopper means comprising first and second ribs formed on said cover member and a third rib formed on said lighting unit to be inserted between said first and second ribs.

6. A mounting structure for mounting a vehicular lighting unit to a mounting port formed on a body panel by inserting said lighting unit through said mounting port, said lighting unit being partly covered by a cover member, said mounting structure comprising a mounting section formed on said lighting unit, said mounting port having a notch formed on the outer periphery of said mounting port, said mounting section comprising at least one engaging portion provided on the outer periphery of the mounting section, the shape of said engaging portion corresponding to said notch so as to pass through said notch when assembling, and a flange provided along the outer periphery of said mounting section such that said body panel along the outer periphery of said mounting port is sandwiched by said engaging section and said flange when said engaging section is rotated upon assembling, and said mounting structure further comprising a restriction means for making it impossible to rotate said lighting unit from the outside without removing said cover member, wherein said restriction means comprises a stopper means for preventing the rotation of said lighting unit said stopper means comprising a rib formed on said cover member and an indentation provided on said lighting unit for receiving said rib.

7. A mounting structure for mounting a vehicular lighting unit to a mounting port formed on a body panel by inserting said lighting unit through said mounting port, said lighting unit being partly covered by a cover member, said mounting structure comprising a mounting section formed on said lighting unit, said mounting port having a notch formed on the outer periphery of said mounting port, said mounting section comprising at least one engaging portion provided on the outer periphery of the mounting section, the shape of said engaging portion corresponding to said notch so as to pass through said notch when assembling, and a flange provided along the periphery of said mounting section such that said body panel along the outer periphery of said mounting port is sandwiched by said engaging section and said flange when said engaging section is rotated upon assembling, and said mounting structure further comprising a restriction means for making it impossible to rotate said lighting unit from the outside without removing said cover member, wherein said restriction means comprises a stopper means for preventing the rotation of said lighting unit said stopper means comprising a pin extending from said cover member and a fitting hall formed in said lighting unit for receiving said pin.

8. A mounting structure for mounting a vehicular lighting unit to a mounting port formed on a body panel by inserting said lighting unit through said mounting port, said lighting unit being partly covered by a cover member, said mounting structure comprising a mounting section formed on said lighting unit, said mounting port having a notch formed on the outer periphery of said mounting port, said mounting section comprising at least one engaging portion provided on the outer periphery of the mounting section, the shape of said engaging portion corresponding to said notch so as to pass through said notch when assembling, and a flange provided along the outer periphery of said mounting section such that said body panel along the outer periphery of said mounting port is sandwiched by said engaging section and said flange when said engaging section is rotated upon assembling, and said mounting structure further comprising a restriction means for making it impossible to rotate said lighting unit from the outside without removing said cover member, wherein said restriction means comprises a stopper means for preventing the rotation of said lighting unit said stopper means comprising a first member extending from said cover member and a second member extending from said lighting unit so as to come into contact with said first member.

* * * * *